Figure 1:
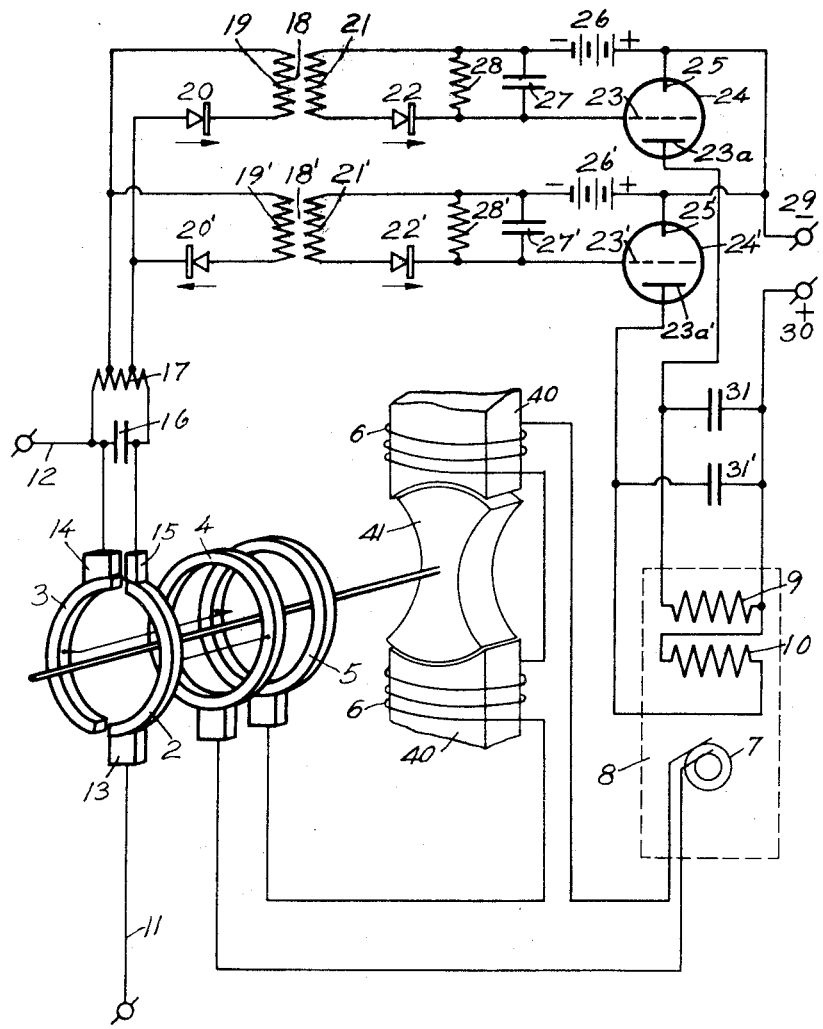

Jan. 16, 1934.    B. C. VON PLATEN    1,943,904
COMMUTATION OF ELECTRIC MACHINES
Filed Aug. 17, 1931    2 Sheets-Sheet 1

Jan. 16, 1934.   B. C. VON PLATEN   1,943,904
COMMUTATION OF ELECTRIC MACHINES

Filed Aug. 17, 1931   2 Sheets-Sheet 2

Patented Jan. 16, 1934

1,943,904

UNITED STATES PATENT OFFICE 1,943,904

COMMUTATION OF ELECTRIC MACHINES

Baltzar Carl von Platen, Stockholm, Sweden

Application August 17, 1931, Serial No. 557,626, and in Sweden August 18, 1930

20 Claims. (Cl. 171—228)

This invention relates to electric machines such as generators, motors and rotary transformers, and more particularly to a method and means for regulating the commutating voltage of such machines so that injurious sparking is prevented.

The commutators of such machines are preferably so designed that the associated brushes short-circuit consecutive segments intermittently. During each short-circuit interval the reversal of the current must be completed as otherwise sparking would occur. Complete or exact commutation occurs when the current after reversal has reached its full value in the new direction before the brush interrupts the short circuit. If the commutation is not complete, the amplitude of the reversed current in the short circuited coil will not coincide with the external direct current amperage and an impulse will occur upon interrupting the short circuit. It is a well known expedient in direct current machines, for example, to provide commutation poles to assist commutation by introducing an auxiliary commutating voltage in the short circuited coil. However, on account of self-induction the current will not reverse voluntarily and the auxiliary voltage must be exactly adjusted in accordance with the current to be commutated in order to cause complete commutation. The slightest deviation from the correct value of the auxiliary voltage will immediately cause a deviation from the conditions of exact commutation. Such exact commutation, however, involves great difficulties, particularly at heavy loads or if high voltages are employed, in which case injurious sparking may occur and cause considerable power losses or injury to the machine or may even endanger the entire plant.

It is accordingly of greatest importance to adjust exactly the voltage in the windings during commutation, hereinafter called the commutating voltage, to a predetermined value and to maintain the deviations from this voltage within permissible limits so that sparking is prevented or reduced to such a value that the normal operation of the machine is not interfered with.

In order to improve commutation, it has heretofore been suggested to divide the commutator brushes into two or more parts and to connect between those parts impedences of various types such as condensers, inductances, resistances or combinations thereof. It has also been suggested to construct the brushes in two sections with a resistance incorporated between various sections of the brush itself, whereby a compact brush unit is obtained which provides various constructional advantages.

In either of the above cases, if commutation is incorrect, a voltage or current impulse which, for convenience, will be hereinafter referred to as a voltage impulse, is obtained between the various parts of the brush whenever the space between two commutator segments passes the brush, or more definitely, whenever a commutator segment leaves the front section of the brush.

To improve the operation it has been previously proposed to utilize these voltage impulses for controlling devices which are capable of regulating the commutating voltage. These devices, which may be of various types, as for example, commutating poles or windings, or magnetizing or exciting generators, will, for convenience, be hereinafter designated as commutation generators. The impulses may first be applied from the brush parts to one or more translating devices as, for example, one or more electrical amplifiers or relays which, in turn, control the above-mentioned commutation generators. In case relays are employed, these may consist of space discharge tubes or of electromagnetic relays, or the like.

Machines of this type controlled in the manner indicated operate quite satisfactorily at comparatively low voltages and moderate amperages. It is, however, not possible to design such systems for high tensions or heavy currents.

According to the present invention the machine is made of a special type having open-coil windings each of which is interconnected between consecutive segments of the commutator. Each winding circuit is controlled by a commutation generator which is in turn controlled by impulses derived from the commutator.

In carrying the invention into effect, it has, however, been found that special features must be included in the translating device. This is due to the fact that in the special type of the commutator system here used the deviation impulses will be of an intermittent nature and of an exceedingly short duration in contradistinction to the conditions in ordinary drum armatures where the deviation impulses derived from divided brushes is practically a continuous current.

The invention, therefore, also provides special means for the selection, equalization, and amplification of such intermittent impulses, in order to obtain an operating impulse of the nature of a continuous current and/or voltage.

The invention has accordingly been found to be especially useful on high voltage machines where sparking has been particularly difficult to control.

Figure 2:
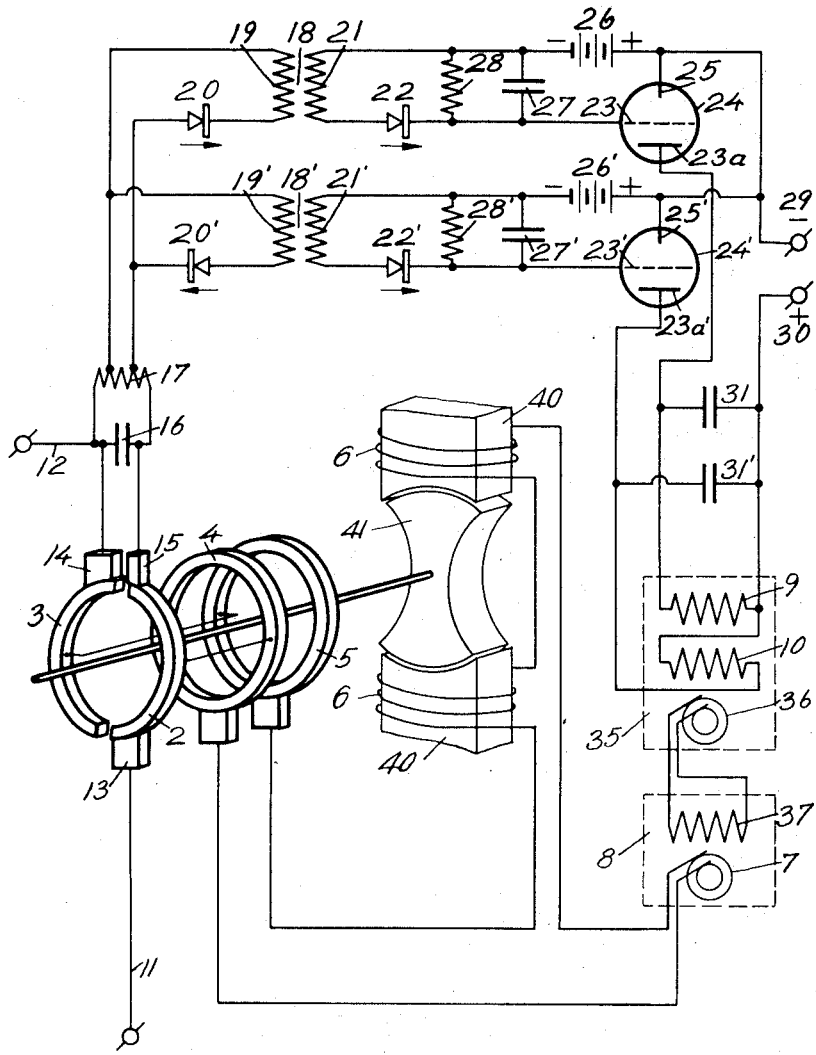

The invention will be more fully described hereinafter with reference to the accompanying drawings, in which Fig. 1 is a schematic diagram of a preferred form of the invention; and Fig. 2 is a schematic diagram of a modified form thereof.

In the figures corresponding parts are designated by similar reference numerals, and although certain specific terms are used for convenience in designating various features of the invention, it is intended that these terms receive as broad an interpretation as the state of the art will permit.

Referring more particularly to Fig. 1, a commutator comprising two commutator segments 2 and 3 is shown as connected by means of slip rings 4 and 5 to an induced winding 6 which is adapted to carry alternating current. Said winding 6 is associated with pole pieces 40 which cooperate with a rotor 41 of magnetic material. Said rotor may have any suitable source of field excitation (not shown). A commutating or induced winding, represented by slip rings 7, of a commutation generator 8 is connected in series with the winding 6 and is adapted to control the commutating voltage of winding 6 so as to assist commutation and to prevent sparking at brushes 13 and 14 which are associated with said commutator. It is to be understood that winding 6 represents the induced winding of any standard type of electric machine and that the above described commutator and slip rings are synchronized with said machine in a manner which is well-known in the art.

Commutation generator 8 is provided with two magnetizing or exciting windings 9 and 10 which are arranged in mutually opposed relationship so that when equal currents traverse both of said windings, the flux produced thereby will be balanced out and no voltage will be induced in the commutating winding.

When the currents traversing windings 9 and 10 are unbalanced by the means to be hereinafter set forth, a flux is produced which causes a voltage to be induced in the commutating winding of such magnitude and direction as to assist commutation of winding 6.

A direct current circuit is connected to commutator segments 2 and 3 by conductors 11 and 12 and brushes 13 and 14 which are associated therewith. Brush 14 may be provided with an auxiliary brush 15, which may be connected thereto by means of a condenser 16 shunted by a potentiometer 17. Said potentiometer may comprise an ohmic resistance or may be of the inductive type. The arrangement is such that any voltage difference which exists between brushes 14 and 15 tends to set up a current in potentiometer 17 or to induce a voltage therein which is utilized for controlling the currents passed through windings 9 and 10 of commutation generator 8.

For this purpose a pair of transformers 18 and 18' are provided, having primaries 19 and 19', respectively, which are connected in parallel across potentiometer 17 or across variable taps thereof. Rectifiers 20 and 20' are connected in series with the primaries 19 and 19', respectively, and are arranged to pass currents in opposite directions so that a current of any given direction which would tend to be induced in primaries 19 and 19' by reason of a voltage drop in potentiometer 17, can pass through only one of said rectifiers and consequently through only one of the primaries above mentioned. These rectifiers may be of any desired type, as, for example, crystals, dry cells, copper oxide rectifiers, hot cathode tubes, electron tubes, or the like.

The secondary windings 21 and 21' of transformers 18 and 18' are connected through rectifiers 22 and 22' to the grids 23 and 23' and cathodes 25 and 25' of space discharge tubes 24 and 24', respectively, which operate as relays or amplifiers. The usual grid biasing batteries 26 and 26' may be connected in grid return leads of such tubes, if desired, to provide the necessary operating characteristics. The usual grid leakage resistances 28 and 28' may be connected between the cathodes and grids of tubes 24 and 24', and suitable condensers 27 and 27' may be associated therewith for introducing a time constant into the circuit and for preventing irregular operation thereof in response to instantaneous voltage surges.

The grids 23 and 23' of tubes 24 and 24' preferably have a negative potential applied thereto as by batteries 26 and 26' of such value as to normally prevent space current from flowing in said tubes or to normally cause the same predetermined amount of space current to flow in both of said tubes.

The anodes 23a and 23a' of tubes 24 and 24' are connected through windings 9 and 10, respectively, of the commutation generator 8 to a suitable source of positive potential indicated as positive terminal 30. Cathodes 25 and 25' are likewise connected to a suitable source of negative potential indicated as negative terminal 29. This potential source may be of any well-known type, as for example, a generator which may be driven by the same shaft as the commutator segments 2 and 3. Condensers 31 and 31' may be connected across said windings 9 and 10, respectively, for improving the operating characteristics thereof, as for example, by decreasing the time rate of current change in said windings and preventing application of sudden excessive impulses thereto. Windings 9 and 10 are so connected to anodes 23a and 23a' that the currents flow through said windings in opposite directions whereby the flux is opposed and in case of equal currents, is balanced out and prevented from producing a current in the commutating winding.

In the following description of the operation of the above described system, the winding 6 will, for convenience, be called over-commutated when the current therein after commutation is of higher value than the current delivered or supplied, and will be called under-commutated when the current therein is less than the current delivered or supplied. At such over or under commutation, voltage impulses arise between the brush parts 14 and 15, which tend to produce a current through potentiometer 17. This current will flow in one direction in the case of under-commutation, and in the opposite direction in the case of over-commutation. The voltage drop of this current, by reason of the opposed connections of rectifiers 20 and 20', will cause a current in the primary of only one of the transformers 18 or 18', whereas the primary of the other transformer will be unaffected thereby.

Assuming, for example, that the machine is running with under-commutation and that the impulses arising between the brush parts are in such a direction as to cause a pulsating uni-directional current to flow through the primary 19 of transformer 18, an alternating current will then be induced in secondary 21 of transformer 18 and will periodically vary the potential of grid 23 of tube 24. Assuming that a biasing potential is applied to said grid from battery 26 of such value as to reduce the space current of said tube to zero, the negative impulses received from secondary 21 will have no effect upon grid 23 inasmuch as the tube is already blocked, whereas the positive impulses which are superimposed on said grid operate to reduce the negative bias thereon and to permit a certain amount of space current to flow through said tube. This space current also flows through exciting winding 9 of commutation generator 8 and thereby induces a voltage in the commutating winding of such value and of such direction as to compensate for the under-commutation of the machine.

In certain instances, as for example, in case the value of the negative part of the cycle is large with respect to the positive part of the cycle, it may be necessary to introduce rectifier 22 which is connected in such direction as to prevent the negative half cycles from being applied to grid 23 or otherwise influencing the operation of the tube. If rectifier 22 were omitted, under the above assumed condition the negative impulses could completely overbalance the positive impulses and prevent the desired functioning of the tube.

In case of over-commutation, the impulses produced in potentiometer 17 are in such direction as to produce a pulsating current in primary 19' of transformer 18', and a corresponding alternating current is induced in secondary 21' of said transformer which is impressed upon the grid circuit of tube 24' and causes space current to flow in said tube and through exciting winding 10. The flux produced by current in winding 10 is opposed to that produced by the current in winding 9, and accordingly a voltage is induced in commutating winding 7 which is in a suitable direction for correcting the over-commutation.

It is to be understood that the tubes 24 and 24' may be so operated as by variation of batteries 26 and 26' that any predetermined equal values of current are normally passed through windings 9 and 10, and that these currents may be unbalanced when impulses are applied to the grid circuit of either of said tubes, and thereby cause a voltage to be induced in the commutating winding for the purpose above set forth. It is also to be understood that commutation generator 8 may be of any well-known type which is capable of producing the desired voltage in said commutating winding in response to a flux induced by currents passing through windings 9 or 10.

Instead of utilizing the variations in current in windings 9 and 10 for directly influencing the magnetizing of commutation generator 8, the result may be produced indirectly by the system illustrated in Fig. 2 in which windings 9 and 10 are employed for varying the magnetizing force of a separate generator 35 which, for example, may be separately driven. The induced winding of said generator, represented by slip rings 36, may be connected to exciting winding 37 of commutation generator 8 for inducing a current in commutating winding thereof, represented by slip rings 7, in the manner set forth in connection with Fig. 1. It is possible in this manner to intensify to any desired extent the control exerted on commutation by the impulses which are applied to the brushes 14 and 15.

It is to be understood that suitable current sources may be provided for operating the cathodes of tubes 24 and 24', although for the sake of simplicity these sources are not shown in the drawings. It is also obvious that in order to obtain a larger current through windings 9 and 10, a plurality of relays or amplifiers may be employed, which may be connected in parallel or in cascade. Furthermore, the connection to the brushes 14 and 15 may be varied, as by the omission of rectifiers 20 and 20' or of potentiometer 17. In certain cases, condenser 16 may be dispensed with. High tension insulation may also be provided for transformers 18 and 18'.

As above pointed out, potentiometer 17 may be of the resistance type or of the inductive type. In the latter case, the reactance thereof increases with the frequency of impulses passing therethrough. This characteristic may be advantageous inasmuch as a higher potential may be tolerated between brush parts at high frequencies than at low frequencies. A similar increase in impedance at high peripheral velocities of the commutator may however be obtained by various other means.

The impulses arising between the brush parts may also be utilized for operating other types of devices.

The commutation generator 8 may be excited exclusively by means of exciting windings 9 and 10 or may be excited by such windings together with various other windings (not shown) which may be directly connected to other sources of current. In certain instances it may be advantageous to thereby vary the amount of control which is exerted by the relays according to speed. Otherwise, it is possible that at certain low speeds, pulsating current may pass through the relays, which would have an undesirable effect, although such conditions may be partly prevented by suitable design of the electrical constants of the circuit, as for example, of condensers 31 and 31'.

On applying the invention to direct current transformers, separate communication generators may be used for the primary and secondary sides of the machine, and the voltage in the commutating winding of each of the generators may be so regulated as to prevent sparking in the commutators with which they are associated.

Various other changes and modifications will be apparent to a person skilled in the art. The foregoing are given by way of example only.

What I claim is:

1. In an electric machine, an induced winding, a commutator and brushes associated therewith, one of said brushes being formed in a plurality of peripherally spaced parts whereby voltage impulses are produced therebetween in response to incorrect commutation, a commutation generator cooperating with said winding and adapted to compensate for said incorrect commutation and to produce sparkless commutation, a pair of exciting windings for said generator, means for normally passing equal and opposite currents through said exciting windings, and means controlled by the amplitude and direction of said impulses for causing an unbalance between the currents in said exciting windings whereby the resultant excitation causes said commutation generator to correct for the condition giving rise to said impulses.

2. In an electric machine, a winding, a commutator and brushes associated therewith, one of said brushes being formed in a plurality of peripherally spaced parts, an impedance interconnecting said parts and adapted to receive voltage impulses in response to an incorrect commutating voltage in said winding, a commutation generator cooperating with said winding and adapted to compensate for said incorrect commutating voltage and to produce sparkless commutation, a pair of exciting windings for said generator, space discharge amplifiers for controlling the currents passed through said exciting windings, and means controlled by the amplitude and direction of said impulses for controlling said amplifiers and thereby causing an unbalance between the currents in said exciting windings whereby the resultant excitation of said commutation generator causes the same to correct for the condition giving rise to said impulses.

3. In an electric machine, a winding, a commutator and brushes associated therewith, one of said brushes being formed in a plurality of peripherally spaced parts, means whereby voltage impulses are produced therebetween in response to an incorrect commutating voltage in said winding, a commutation generator adapted to compensate for said incorrect commutating voltage and to produce sparkless commutation, a pair of exciting windings for said generator, space discharge devices having their space current paths connected to said windings, said devices being normally biased to prevent flow of space current, and means controlled by the amplitude and direction of said impulses for decreasing said bias and thereby causing current to flow in one of said exciting windings whereby the resultant excitation of said commutation generator causes said commutation generator to correct said commutating voltage.

4. In an electric machine, a winding, a commutator and brushes associated therewith, one of said brushes being formed in a plurality of peripherally spaced parts interconnected by an impedance, a commutation generator, a pair of exciting windings for said generator, space discharge tubes for controlling the currents passed through said exciting windings, the input circuits of said tubes being connected through transformers to said impedance, oppositely biased rectifiers in circuit with the primaries of said transformers whereby uni-directional impulses are applied to only one of said transformers from said impedance, means for normally biasing said tubes to cause a predetermined current to flow through said windings, and means whereby said impulses change the bias of one of said tubes and cause an increased current to flow in one of said windings thereby producing an excitation of said commutation generator which causes said commutation generator to correct for the condition giving rise to said impulses.

5. In an electric machine, a commutator having a plurality of segments, an induced winding circuit comprising open-coil windings connected between consecutive segments, means whereby intermittent voltage impulses are set up in response to a deviation from the correct commutating voltage in said winding circuit, a commutation control device adapted to induce auxiliary commutation voltages in said winding circuit, and means controlled by said impulses for controlling said device so as to change the auxiliary commutation voltage induced in said circuit to thereby compensate for the deviation which gave rise to said impulses.

6. In an electric machine, a commutator having a plurality of segments, an induced open-coil winding connected between consecutive segments adapted to carry alternating voltages having zero-voltage intervals, brushes associated with said commutator and each adapted to short circuit two consecutive segments intermittently in synchronism with the zero-voltage intervals, commutation means for introducing an auxiliary voltage in the circuit of said winding during the short-circuit intervals, and means associated with said brushes responsive to intermittent impulses arising upon a deviation from complete commutation, said last means being adapted to cause said commutation means to restore the conditions of complete commutation.

7. In an electric machine, a commutator having a plurality of segments, an induced winding of open-coil type connected between consecutive segments, means whereby intermittent voltage impulses are set up in response to a deviation from the correct commutating voltage in said winding, auxiliary commutation means for inducing auxiliary commutation voltages in the circuit of said winding, condenser means for storing and equalizing said impulses, and electrical relay means associated with said condenser means and adapted to control the auxiliary commutation voltage induced by said commutation means so as to compensate for the deviation which gave rise to said impulse.

8. In an electric machine, a commutator having a plurality of segments, an induced winding circuit comprising open-coil windings connected between consecutive segments, a main brush associated with said commutator, an auxiliary brush peripherally spaced from said main brush, a circuit associated with said brushes, including condenser means adapted to store and equalize intermittent impulses caused by a deviation from the correct commutating voltage in said winding circuit, auxiliary commutation means for inducing auxiliary commutation voltages in said winding circuit, and electrical relay means controlled by said condenser means for causing said commutation means to compensate for said deviation and to restore complete commutation conditions.

9. In an electric machine, a commutator having a plurality of segments, an induced winding circuit comprising open-coil windings connected between consecutive segments, separate brush elements associated with said commutator, two impulse channels associated with said brushes and unidirectionally blocked in mutually opposite impulse directions for the selection and transfer of intermittent impulses derived from the brushes upon a deviation from correct commutation, auxiliary commutation means for inducing auxiliary commutation voltages in said winding circuit, and electrical relay means controlled by the impulse direction and amplitude in said channels for causing said commutation means to compensate for said deviation and to restore complete commutation conditions.

10. In an electric machine, a commutator having a plurality of segments, an induced winding circuit comprising open-coil windings connected between consecutive segments, separate brush elements associated with said commutator, two impulse channels associated with said brushes and unidirectionally blocked in mutually opposite impulse directions for the selection and transfer of impulses derived from the brushes upon a deviation from correct commutation, condenser means associated with said channels for storing and equalizing said impulses, auxiliary commutation means for introducing auxiliary commutation voltages in said winding circuit, and electrical relay means controlled by the impulse direction and amplitude in said channels and adapted to cause said commutation means to compensate for said deviation and to restore complete commutation conditions.

11. In an electric machine, a commutator comprising a plurality of segments, an induced winding circuit comprising open-coil windings connected between consecutive segments, separate brush elements associated with said commutator, two impulse channels associated with said brushes and unidirectionally blocked in mutually opposite impulse directions for the selection and transfer of intermittent impulses derived from the brushes upon a deviation from correct commutation, auxiliary commutation means for inducing auxiliary commutation voltages in said winding circuit, two excitation windings disposed on said commutation means for controlling the voltage thereof and each associated with one of said impulse channels, and electrical relay means controlled by the impulse direction and amplitude in said channels for selecting and influencing one of said excitation windings so as to compensate for said deviation and to restore complete commutation conditions.

12. In an electric machine, a commutator having a plurality of segments, an induced winding circuit comprising open-coil windings connected between consecutive segments, a divided brush associated with said commutator, auxiliary commutation means for introducing auxiliary commutation voltages in said winding circuit, transformer means having a primary winding associated with said divided brush and responsive to intermittent impulses caused by deviation from correct commutation of said winding circuit, a secondary winding on said transformer, and impulse responsive means associated with said secondary winding adapted to influence said commutation means so as to restore commutation to correct conditions.

13. In an electric machine, a commutator having a plurality of segments, an induced winding circuit comprising open coil windings connected between consecutive segments, separate brush elements associated with said commutator, two primary impulse channels associated with said brushes and unidirectionally blocked in mutually opposite impulse directions for the selection of intermittent impulses derived from said brush unit in response to a deviation from correct commutation, two transformers having primary windings each associated with one of said primary channels, and secondary windings each in induced relationship with one of said primary windings, two secondary impulse channels each associated with one of said secondary windings, auxiliary commutation means for inducing auxiliary commutation voltages in said winding circuit, and two electrical relay means each associated with one of said secondary channels for rectifying impulses received and influencing said commutation means according to impulse direction and amplitude to thereby compensate for said deviation and to restore complete commutation conditions.

14. In an electric machine, a commutator having a plurality of segments, an induced winding circuit comprising open coil windings connected between consecutive segments, a divided brush associated with said commutator for deriving intermittent impulses in response to deviation from correct commutation in said winding circuit, a commutation generator for introducing auxiliary commutation voltages in said winding circuit, an intermediary generator controlling the excitation of said commutation generator, means for causing said impulses to influence said intermediary generator so as to change the voltage of the commutation generator so as to restore commutation to correct conditions.

15. In an electric machine, a commutator having a plurality of segments, an induced winding circuit comprising open coil windings connected between consecutive segments, a divided brush associated with said commutator for deriving intermittent impulses in response to a deviation from correct commutation in said winding circuit, a commutation generator for introducing auxiliary commutation voltages in said winding circuit, an excitation winding on said commutation generator, an intermediary generator, an armature winding on said intermediary generator associated with said commutation generator excitation winding, an excitation winding on said intermediary generator, means for causing said impulses to influence said intermediary generator excitation winding so as to change indirectly to an amplified degree the voltage of said commutation generator so as to restore commutation to correct conditions.

16. In an electric machine, a commutator having a plurality of segments, an induced winding circuit comprising open coil windings connected between consecutive segments, a divided brush associated with said commutator for deriving intermittent impulses in response to deviation from correct commutation in said winding circuit, auxiliary commutation means for introducing auxiliary commutation voltages in said winding current path, transformer means having a primary winding associated with said divided brush, a secondary winding on said transformer, impulse rectifying means associated with said secondary winding, condenser means associated with said rectifying means, impulse responsive means associated with said condenser means and said divided brush for influencing said commutation means so as to restore commutation to correct conditions.

17. In an electric machine, a commutator having a plurality of segments, an induced winding circuit comprising open coil windings connected between consecutive segments, separate brush elements associated with said commutator, two primary impulse channels associated with said brushes and unidirectionally blocked in mutually opposite impulse directions for the selection of intermittent impulses derived from said brush unit in response to deviation from correct commutation, two transformers having primary windings, each associated with one of said primary channels and having secondary windings, two secondary impulse channels each associated with one of said secondary windings, two impulse rectifiers each included in one of said secondary channels, two condensers each associated with one of said rectifiers, auxiliary commutation means for inducing auxiliary commutation voltages in said winding circuit, and two electrical relay means, each associated with one of said condensers for receiving equalized impulses therefrom and adapted to influence said commutation means according to impulse direction and amplitude so as to compensate for said deviation and to restore complete commutation conditions.

18. In an electric machine, a commutator having a plurality of segments, an induced winding circuit comprising open coil windings connected between consecutive segments, separate brush elements, together forming a commutator brush unit, associated with said commutator, two primary impulse channels associated with said brush unit and unidirectionally blocked in mutually opposite impulse directions for the selection of intermittent impulses derived from said brush unit in response to deviation from correct commutation, two transformers having primary windings, each associated with one of said primary channels, and having secondary windings, two secondary impulse channels each associated with one of said secondary windings, two impulse rectifiers each included in one of said secondary channels, two leakage resistances for discharging said rectifiers, auxiliary commutation means for inducing auxiliary commutation voltages in said winding circuit, two thermionic valve sets, a grid circuit included in each of said sets and associated with each of said rectifiers for receiving rectified impulses therefrom and influencing, through the appertaining valve set, said commutation means according to impulse direction and amplitude so as to compensate for said deviation and to restore complete commutation conditions.

19. In an electric machine, a commutator having a plurality of segments, a plurality of commutator brushes each having a peripheral width less than that of one segment, an induced winding circuit associated with said commutator, means whereby intermittent voltage impulses are set up in response to a deviation from the correct commutating voltage in said winding circuit, a commutation control device adapted to induce auxiliary commutation voltages in said winding circuit, and means controlled by said impulses for controlling said device so as to change the auxiliary commutation voltage induced in said circuit to thereby compensate for the deviation which gave rise to said impulses.

20. In an electric machine, a commutator having a plurality of segments, a plurality of commutator brushes each having a peripheral width less than that of one segment, an induced winding circuit associated with said commutator adapted to carry alternating voltages having zero-voltage intervals, said brushes being adapted to short circuit two consecutive segments intermittently in synchronism with the zero-voltage intervals, commutation means for introducing an auxiliary voltage in the circuit of said winding during the short-circuit intervals, and means associated with said brushes responsive to intermittent impulses arising upon a deviation from complete commutation, said last means being adapted to cause said commutation means to restore the conditions of complete commutation.

BALTZAR CARL von PLATEN.